United States Patent [19]

Frisch, Jr. et al.

[11] Patent Number: 4,927,864

[45] Date of Patent: May 22, 1990

[54] USE OF A POLYAMINE AS CELL OPENER IN POLYURETHANE FOAM

[75] Inventors: Kurt C. Frisch, Jr., Fridley, Minn.; Robert F. Harris, Midland, Mich.

[73] Assignee: The Dow Chemical Company, Midland, Mich.

[21] Appl. No.: 304,750

[22] Filed: Jan. 31, 1989

[51] Int. Cl.$^5$ ............................................. C08G 18/14
[52] U.S. Cl. .................................... 521/163; 521/128; 252/182.26; 252/182.28
[58] Field of Search .............................. 521/163, 128; 252/182.26, 182.28

[56] References Cited

U.S. PATENT DOCUMENTS

| | | | |
|---|---|---|---|
| 4,493,909 | 1/1985 | Haas et al. | 521/166 |
| 4,596,665 | 6/1986 | Gonzalez et al. | 252/182 |
| 4,751,255 | 6/1988 | Bentley et al. | 521/163 |

*Primary Examiner*—Maurice J. Welsh

[57] ABSTRACT

This invention relates to the use of polyamine compounds having their backbone modified by the incorporation of aminocarbonyl or aminothiocarbonyl moieties as cell opening agents in the preparation of open-celled flexible polyurethane foams.

Use of the polyamine compound as cell opening agent provides for improved cell opening and provides foam with acceptable physical properties.

22 Claims, No Drawings

USE OF A POLYAMINE AS CELL OPENER IN POLYURETHANE FOAM

FIELD OF THE INVENTION

This invention relates to an open-celled polyisocyanate-based polymer, and more particularly relates to the use of polyamines as cell opening agents in the preparation of such polymers.

BACKGROUND OF THE INVENTION

When open-celled polyisocyanate-based polymers such as flexible polyurethane foams are prepared, it is important to ensure that the foam has a sufficient quantity of open cells to prevent shrinkage on curing. The preparation of flexible polyurethane foam is nearly always accompanied by the formation of some closed cells. The presence of closed cells substantially reduces the dimensional stability and flexibility of the foam while increasing its rigidity and brittleness. The closed cell content of a foam can be reduced by mechanical means such as crushing or flexing of the foam during its curing process causing the closed cells to be ruptured and opened. Alternatively, the extent of formation of closed cells can be minimized in part by careful selection of surfactants and/or stabilizers and particular choice of urethane catalysts and their levels for the preparation of the foams. For example, U.S. Pat. Nos. 3,748,288 and 3,884,848 teach the use of surfactants which are hydrophobic organosilicones for improving the open cell content of a foam. In U.S. Pat. No. 4,596,665, the use of polyoxybutylene alcohols as a cell opening agent is taught in the preparation of lower resilience polyurethane foams.

Other additives such as polyolefins, waxy hydrocarbons such as paraffin oil, are commonly employed as cell opening agents. However, they suffer from problems in incompatibility with the reactants and the foam itself.

A common problem with nearly all conventional cell openers is that they cause deterioration in the mechanical properties of the foams, especially compressive strengths. Since they do not contribute to the overall properties of the foam, except to open cells, it is desirable to reduce the quantity of cell opener required or modify it in such a way that it may contribute to the properties of the foam. For example, U.S. Pat. No. 4,493,909 teaches the use of poly-N,N-hydroxyalkylamides of polybasic carboxylic acids in the production of highly elastic polyurethane foams as a cell opening agent. The efficiency of these products as cell opening agents is dependent on a primary hydroxyl content and, in addition, is largely dependent on the nature of the carboxylic acid used in its preparation.

Accordingly, it would be desirable to provide a cell opening agent which can assist in cell opening and maintain the mechanical properties of the foam and one in which the properties are not dependent on the presence of primary hydroxyl groups.

SUMMARY OF THE INVENTION

In one aspect, this invention is an open-celled polyisocyanate-based polymer the preparation of which comprises reacting in the presence of a blowing agent,
(a) an organic polyisocyanate,
(b) at least one polyfunctional isocyanate-reactive component, and
(c) from about 0.1 to about 15 percent by weight, relative to the amount of (b), of a cell opener which comprises a polyamine containing at least two terminal amine moieties, at least three polyalkyleneoxy moieties and at least two aminocarbonyl or aminothiocarbonyl moieties selected from the group consisting of urea, amide, biuret, thiourea, thioamide and dithiobiuret, or mixtures thereof provided that each aminocarbonyl or aminothiocarbonyl moiety is separated from each terminal amine moiety by at least one polyalkyleneoxy moiety.

In another aspect, this invention is a polyfunctional isocyanate-reactive composition which comprises (a) at least one polyfunctional isocyanate-reactive component, and (b) from about 0.1 to about 15 percent by weight relative to (a), of a cell opener characterized in that the cell opener comprises polyamine containing at least two terminal amine moieties, at least three polyalkyleneoxy moieties and at least two aminocarbonyl or aminothiocarbonyl moieties selected from the group consisting of urea, amide, biuret, thiourea, thioamide and dithiobiuret, or mixtures thereof provided that each aminocarbonyl or aminothiocarbonyl moiety is separated from each terminal amine moiety by at least one polyalkyleneoxy moiety.

Surprisingly, the use of such polyamines containing aminocarbonyl and/or aminothiocarbonyl moieties in the preparation of polyisocyanate-based foams provides for products which have good mechanical properties and considerably reduced tendency towards shrinkage when such foams are open-celled flexible polyurethane products.

DETAILED DESCRIPTION OF THE INVENTION

As already described hereinabove, the invention relates to the use of polyamines having aminocarbonyl and/or aminothiocarbonyl groups in their backbone as cell opening agents in the preparation of open cell polyisocyanate-based polymers such as flexible polyurethane foam.

The polyamine compounds suitable as cell opening agents are those where the polyamine is comprised of at least two terminal amine moieties, at least three polyalkyleneoxy moieties and at least two aminocarbonyl or aminothiocarbonyl moieties selected from the group consisting of urea, amide, biuret, thiourea, thioamide, dithiobiuret, or mixtures thereof, provided that each aminocarbonyl or aminothiocarbonyl moiety is separated from each terminal amine moiety by at least one polyalkyleneoxy moiety.

Suitable cell opening agents include those represented by the general formula

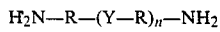

$$H_2N-R-(Y-R)_n-NH_2$$

wherein R is a polyoxyalkylene moiety having a molecular weight from about 44 to about 7200: Y is an aminocarbonyl or aminothiocarbonyl selected from the group consisting of urea, amide, biuret, thiourea, thioamide, or dithiobiuret; and n is a positive integer greater than or equal to 2, such that the equivalent weight of the polyamine is from about 70 to about 10,000.

The polyoxyalkylene moiety is a polyoxyalkylene polymer prepared from the reaction of one or more α- or β-alkylene oxides with an initiator containing from about 2 to about 4, preferably from about 2 to about 3, labile hydrogen atoms. Exemplary of suitable alkylene oxides are ethylene oxide, propylene oxide, 1,2-butylene oxide, 2,3-butylene oxide, 1,2-pentylene oxide, 2,3-pentylene oxide, the diverse hexylene oxides, styrene oxides, glycidyl alkyl ethers and the like. Most preferred are polymers of ethylene oxide, propylene oxide, 1,2-butylene oxide, 2,3-butylene oxide, or mixtures thereof, and especially preferred is propylene oxide. As stated above, the polyoxyalkylene moiety advantageously has a molecular weight of from about 44 to about 7200, preferably from about 88 to about 3000 and more preferably from about 132 to about 2200, and most preferably from about 200 to about 1000.

Also as stated above, n is a positive integer greater than or equal to 2, preferably from about 2 to about 40, more preferably from about 2 to about 20 and most preferably from about 2 to about 10, and especially preferred from about 2 to about 6. The integer, n, and the molecular weight of the polyoxyalkylene polymer, R, are such so as to provide for a polyamine compound having an equivalent weight from about 70 to about 10,000, preferably from about 200 to about 6000, and more preferably from about 1000 to about 4000.

The polyamines which function as cell opening agents in this invention are prepared by reaction of an aminated polyol with, for example, urea, when it is desired that the aminocarbonyl moiety, Y, be a urea moiety. The aminated polyol is a polyoxyalkylene reaction product containing primary amino groups and has a sufficient polyoxyalkylene content so as to provide for the molecular weight of the R moiety as described above. The aminated polyol can contain from about 2 to about 4 primary amino groups, but it is preferred to employ aminated polyols with two primary amino groups when preparing the cell opening agents as used in this invention.

The aminated polyols suitable for the preparation of the polyamine cell opening agent of this invention can be prepared by the reductive amination of polyether polyols using hydrogen and ammonia in the presence of a catalyst. The polyether polyols to be aminated preferably have an oxide composition and molecular weight so as to provide the polyoxyalkylene moiety R as described hereinabove. This reductive amination of polyols is described in U.S. Pat. Nos. 3,128,311: 3,152,998: 3,236,895; 3,347,926: 3,654,370: 4,014,933 and 4,153,581, the relevant portions of which are herein incorporated by reference.

The aminocarbonyl moieties of the cell opening agent, urea, amide and biuret, can be provided by reacting the aminated polyol with, respectively, urea, a dicarboxylic acid and biuret: and the aminothiocarbonyl moieties, thiourea, thioamide and dithiobiuret, by the reaction of the aminated polyol with, respectively, thiourea, a dithiocarboxylic acid and dithiobiuret.

In the preparation of the polyamines to be used as cell opening agents in this invention, containing two or more aminocarbonyl moieties or aminothiocarbonyl moieties in their backbone, an aminated polyol is contacted with the aminocarbonyl- and/or aminothiocarbonyl-containing compounds under conditions sufficient to produce the desired product. Preferably, such reactions are carried out at temperatures in the range from about 100° C. to about 200° C., more preferably from about 125° C. to about 200° C. and most preferably from about 150° C. to about 175° C.

The stoichiometry of the reactants used to prepare the polyamine cell opening agents can vary depending on the number of internal aminocarbonyl and/or aminothiocarbonyl moieties desired in the average backbone of the molecule. For example, in the case of the reaction of an aminated polyol containing two primary amine groups with a biuret, a molar ratio of two moles aminated polyol per one mole biuret will give a product which contains about one biuret moiety per average polyamine molecule. In contrast, an aminated polyol:biuret mole ratio of 1.3:1 will give a polyamine product which contains about 4 biuret moieties per average moleoule. In the case of urea-containing polyamine cell opening agents, a mole ratio of two moles aminated polyol to one mole urea will give a polyamine product which contains about one urea moiety per average product molecule. Similarly, an aminated polyol:urea molar ratio of 1.3:1 will give a product which contains about 4 urea moieties per average polyamine molecule.

The polyamines containing aminocarbonyl or aminothiocarbonyl moieties in their backbone are described as is a method for their preparation in the pending patent application Ser. No. 247,460, filed Sept. 21, 1988 and titled "Amino-functional Polyethers Containing Urea, Biuret, Thiourea, Dithiobiuret, Thioamine and/or Amide Moieties in Their Backbone and Urethane/Urea Prepolymers and Polymers Made Therefrom" incorporated herein by reference in this application.

The polyamine cell opening agent is used in an effective amount sufficient to provide the desired amount of cell opening. Generally, the cell opening agent comprises from about 0.1 to about 15, preferably from about 1 to about 10, and more preferably from about 1 to about 5 weight percent of the polyfunctional isocyanate-reactive component present. The optimum quantity of cell opener to be used in preparing the polymer within that range for a particular combination of reactants should be determined by a series of simple tests. Quantities of cell opening agent used in excess of this range may result in the collapse of foam. Smaller quantities of cell opening agent may not give the desired amount of open cells in the foam.

The polymer of the invention is prepared by reacting an organic polyisocyanate with at least one polyfunctional isocyanate-reactive component and the polyamine cell opening agent in the presence of a catalyst and blowing agent.

The quantity of polyisocyanate employed is sufficient to act with all isocyanate-reactive hydrogen atoms that may be present in the reaction mixture including those of the polyfunctional isocyanate-reactive component, the cell opening agent and any other component which optionally may be present and containing isocyanate-reactive hydrogen atoms, for example, water and low molecular weight chain extenders or cross-linkers. Typically, approximately a stoichiometric amount or a slight deficiency or excess of the polyisocyanate is employed so as to provide from about 0.8 to about 1.3, preferably about 0.9 to about 1.2 and more preferably from about 1.01 to about 1.15 isocyanate groups per isocyanate-reactive hydrogen present in the reaction mixture. In some instances the quantity of isocyanate used may be expressed as an index. An index of 100 represents 1.0 isocyanate group per isocyanate-reactive hydrogen, an index of 105 indicates 1.05 isocyanate groups per reactive hydrogen.

Organic polyisocyanates which may be suitably employed to prepare the polymers of this invention include aromatic, aliphatic and cycloaliphatic polyisocyanates as well as combinations thereof. Representative of these types are the diisocyanates such as m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthalene-1,5-diisocyanate, 1-methoxyphenyl-2,4-diisocyanate, diphenylmethane-2,4-diisocyanate, diphenylmethane-4,4-diisocyanate, 4,4'-biphenylene diisocyanate, 3,3'-dimethoxy-4,4'-diphenyl diisocyanate, and 3,3'-dimethyldiphenylpropane-4,4'-diisocyanate; the triisocyanates such as polymethylene polyphenyl isocyanates and toluene-2,4,6-triisocyanate: and the tetraisocyanates such as 4,4'-dimethyldiphenylmethane-2,2', 5,5'-tetraisocyanate. Especially useful due to their availability and properties are toluene diisocyanate, diphenylmethane-4,4'-diisocyanate and polymethylene polyphenyl isocyanates.

Crude polyisocyanates may also be used in the practice of the present invention such as crude toluene diisocyanate obtained by the phosgenation of a mixture of toluene diamines or crude diphenylmethylene diisocyanate obtained by the phosgenation of crude diphenyl methylene diamine. The preferred undistilled or crude isocyanates are disclosed in U.S. Pat. No. 3,215,652.

Also useful are the isocyanate-terminated prepolymers and quasi-prepolymers prepared by reacting an excess of polyisocyanate and an isocyanate-reactive compound such as, for example, a polyether polyol. Trimer-containing polyisocyanates and prepolymers as are described in UK Patent specification No. 1,357,659 are also useful herein.

Suitable polyfunctional isocyanate-reactive components for preparing the polymer of the invention are those containing nominally from 1 to about 8 isocyanate-reactive hydrogen atoms and preferably from about 2 to about 4 isocyanate-reactive hydrogen atoms, and having an equivalent weight from about 31 to about 5000, preferably from about 500 to about 3000, more preferably from about 1000 to about 2500. The isocyanate-reactive hydrogen atoms may be those associated with amine, thiol, carboxyl and, preferably, hydroxyl groups. The quantity of polyfunctional isocyanate-reactive component employed depends on the equivalent weight, average functionality and polymer properties desired.

For an open-celled flexible polyurethane foam, when the polyfunctional isocyanate-reactive component has from nominally 2 to 4 isocyanate-reactive hydrogen atoms and an equivalent weight from about 500 to about 3000, then quantities from about 85 to about 99.9, preferably about 90 to about 99, and more preferably about 95 to 99 weight percent of the total weight of polyfunctional isocyanate-reactive component(s) and polyamine cell opening agent are employed. Up to 20 weight percent, preferably less than 5 weight percent of the polyfunctional isocyanate-reactive component may be substituted by other components having equivalent weights lower than about 500 and/or containing more than 4 isocyanate-reactive hydrogen atoms when it is necessary to achieve desired physical properties in a polymer. Preferred isocyanate-reactive compounds are polyesters, polyoxyalkylene ethers, polythioethers, polyacetals, polycarbonates and polyester amides containing from about 2 to about 4 hydroxyl groups, of the type known to be useful for the production of cellular and noncellular polyisocyanate-based polymers. It is particularly preferred to use polyoxyalkylene ethers, polyethers, of the type obtained by the addition of one or more alkylene oxides (ethylene oxide and particularly propylene oxide) to a difunctional or polyfunctional initiator such as, for example, water, glycerine, trimethylol propane, pentaerythritol, α-methyl glucoside, α-hydroxyethyl glucoside, hexanetriol, hexitol, heptitol, sorbitol, mannitol; sucrose and amine compounds, for example, ethylenediamine, aminoethyl piperazine and the like, and mixtures of two or more such compounds. The alkylene oxide adducts of the initiator can be prepared using techniques well-known to those skilled in the art of preparing polyether polyols. Suitable processes are described by R. A. Newton, "Propylene Oxide Polymers and Higher 1,2-Epoxide Polymers"; *Kirk-Othmer Encyclopedia of Chemical Technology,* Vol. 18, pp. 633–645 (1982) and U.S. Pat. Nos. 1,922,459 and 3,040,076.

Additional polyfunctional isocyanate-reactive components suitable for the preparation of the polyisocyanate-based polymers of this invention are described in U.S. Pat. No. 4,263,408, columns 4–7, incorporated herein by reference.

To prepare an open-celled polyisocyanate-based polymer of this invention a polyisocyanate is reacted with the isocyanate-reactive component(s) in the presence of a blowing agent as described hereinafter.

The blowing agent used in this invention includes material which vaporizes or otherwise generates a gas under the conditions encountered in the foaming reaction. Materials which boil under such conditions include low boiling halogenated hydrocarbons such as trichlorofluoromethane, dichlorodifluoromethane, chlorotrifluoromethane, methylene chloride, trichloroethane, trichlorofluoroethane, trichlorodifluoroethane and the like. Suitable materials which react to form a gas under such conditions include water and the so-called azo blowing agents. Materials which dehydrate to release gaseous water under such conditions, including for example, magnesium sulfate heptahydrate, sodium carbonate decahydrate, sodium phosphate dodecahydrate, calcium nitrite tetrahydrate, ammonium carbonate tetrahydrate and the like are less preferably used as a blowing agent. High surface area particulate solids are also useful blowing agents as described in U.S. Pat. No. 3,753,933. Preferred are water, halogenated hydrocarbons and mixtures thereof.

A sufficient amount of blowing agent is used to provide a cellular structure to the polymer. Preferably, sufficient thereof is used to provide the polymer with a density of from about 6 to about 150, preferably from about 12 to about 100 and more preferably from about 15 to about 60 kg/m³. When water is the blowing agent, about 0.5 to about 8 parts by weight thereof are advantageously employed per 100 parts of the polyfunctional isocyanate-reactive components including the polyamine cell opening agent used to prepare the foam. When a halogenated hydrocarbon blowing agent is used, preferably from about 1 to about 30 parts by weight of blowing agent are used.

A catalyst for the reaction of the isocyanate-reactive hydrogen-containing components and polyisocyanate is generally and preferably employed herein. In addition, when water is used as a blowing agent, a catalyst for its reaction with isocyanate groups of the polyisocyanate or isocyanate-terminated prepolymer to generate carbon dioxide is generally employed herein. Ordinarily, the type and amount of catalysts employed herein are such that the relative rates of the polymerization blowing reactions provide a cellular foam having substantially uniform cells. Suitable catalysts for the polymerization reaction include organometallic compounds such as organotin, organomercury or organolead compounds as described in U.S. Pat. No. 2,846,408, incorporated herein by reference. Tertiary amine catalysts such as triethylene diamine, triethylamine, methyl morpholine, N,N-dimethylaminoethylpiperazine and the like are also useful catalysts for the polymerization reaction. Tertiary amine compounds are also effective catalysts for the blowing reaction. Generally, such catalysts are employed in an amount from about 0.02 to about 2, preferably 0.01 to 1 part per 100 parts by weight of isocyanate-reactive components including the polyamine cell opening reagent. Catalysts known to promote trimerization of the polyisocyanate such as quaternary amine salt and alkali metal carboxylate salts may also be employed.

A surfactant is normally used in preparing polymer foams according to this invention. Suitable surfactants are well-known and their use in preparing polymer foams is well understood. The surfactant stabilizes the cellular structure of the polymer during the polymerization until it is sufficiently cured to maintain its cellular structure independently. In general, representative of such foam surfactants are alkoxysilanes, polysilyl phosphonates, polydimethylsiloxanes, the condensates of ethylene oxide with a hydrophobic base formed by condensing propylene oxide with propylene glycol, the alkylene oxide adducts of ethylenediamine, and the polyoxyalkylene esters of long chain fatty acids and sorbitan and siloxaneoxyalkylene block copolymers. Preferred of such materials are the siloxaneoxyalkylene block copolymers. Illustrative block copolymers are described in U.S. Pat. Nos. 2,834,748; 2,917,480; 3,505,377: 3,507,815: 3,563,924: and 4,483,894.

Examples of suitable surfactants for use in making the polymers of this invention include silicones such as BF-2270, BF-2370, BF-4613, BF-4900, B-4113, B-4380, B-8014, B-8017, B-8200, B-8202, B-8614 and B-8681 sold under the trade name of Tegostab by Goldschmidt; L-5303, L-5305, L-520 and L-540 available from Union Carbide Corp.: and DC-190, DC-196, DC-198, DC-1372 and DC-5043 available from Dow Corning Corp. The surfactant is generally employed in amounts from about 0.05 to about 5, preferably from about 0.1 to about 2 parts by weight per 100 parts of polyfunctional isocyanate-reactive component including the polyamine cell opening agent.

In addition, the polymer prepared can optionally contain a variety of additives commonly employed in the preparation of flexible urethane foams. Representatives include fire-retardant agents, fillers, dyes, pigments, anti-oxidizing agents, fungicides, antistatic agents and the like.

The open-cellular polyisocyanate-based polymers of this invention may be prepared in a one-shot process. In the one-shot process, where foaming is carried out in machines, the components containing isocyanate-reactive hydrogen atoms, catalysts, surfactants, blowing agent and optional additives may be introduced simultaneously to the mixing head where they are combined with the polyisocyanate to give the polyurethane-forming mixture. The mixture can be poured or injected into a suitable container or mold as required. For use of machines with a limited number of component lines into the mixing head, a premix of all the components except the polyisocyanate (and supplementary blowing agent when a gas is used) to give a polyol formulation can be advantageously employed. This simplifies the metering and mixing of the reaction components as the time the polyurethane-forming mixture is prepared. Alternatively, the polymers may be prepared by the so-called "quasi-prepolymer method." In this method a portion of the polyfunctional isocyanate-reactive component is reacted in the absence of catalysts with the polyisocyanate in an amount so as to provide from about 10 to about 30 percent of free isocyanate groups in the reaction product based on the weight of the so-formed prepolymer. To prepare the polymer, foam, the remaining portion of the polyfunctional isocyanate-reactive component and the polyamine cell opening agent are allowed to react together in the presence of catalysts and other appropriate additives such as blowing agent, surfactant, etc., with the prepolymer. Equipment and processes suitable for the preparation of the polyisocyanate-based polymers of this invention are described in, for example, U.S. Pat. Nos. 2,764,565 and 4,263,408, and also in Kunststoff-Handbuch, Vol. 7 published by Vieweg & Hochtlen, Carl Hanser Verlag, Munich (1966), e.g., on pages 121–205.

The open-celled polyisocyanate-based polymers, foams, made in accordance with the present invention may be used, for example, in furniture upholstery, mattresses, automobile seats, arm rests, sponges and structural elements as well as seat and dashboard facings. In addition, they may find uses as packing materials and thermal insulation or sound insulation materials.

ILLUSTRATIVE EMBODIMENTS

The following examples are given to illustrate the invention and should not be interpreted as limiting it in any way. Unless stated otherwise, all parts and percentages are given by weight.

EXAMPLE 1

Box foams are prepared according to the formulation given in Table 1. The ingredients were mixed together for about 2.7 seconds at approximately 3600 rpm with a pinhead mixer to give a reacting mixture. The box foams are prepared by pouring the reacting mixture in a mold of 15×15×4.5 inches at 65° C. and demolded after 3 minutes. The physical properties of the foams are shown in Table II.

In the examples, the properties of the molded foams are determined in accordance to the following standard test procedures: resilience:ASTM D-3574-81, Modulus and Compressive Load Deflection:ASTM D-3574, tensile strength and elongation:ASTM-D-3574, tear resistance:ASTM D-3574.

TABLE I

|  | Comp Sample A* | Sample I | Sample II | Sample III |
|---|---|---|---|---|
| Polyol A [1] | 50 | 50 | 50 | 50 |
| Polyol B [2] | 50 | 50 | 50 | 50 |
| Water | 4.0 | 4.0 | 4.0 | 4.0 |
| Diethanolamine (99%) | 1.5 | 1.5 | 1.5 | 1.5 |
| DC-5043 Surfactant [3] | 1.5 | 1.5 | 1.5 | 1.5 |
| DC-X2-5244 Surfactant [4] | 1.2 | 1.2 | 1.2 | 1.2 |
| Polycat X-543 Catalyst [5] | 0.7 | 0.7 | 0.7 | 0.7 |
| NIAX A-107 Catalyst [6] | 0.4 | 0.4 | 0.4 | 0.4 |
| Polyamine, cell opener [7] | 0 | 1 | 5 | 10 |

TABLE I-continued

|  | Comp Sample A* | Sample I | Sample II | Sample III |
|---|---|---|---|---|
| Voranate T-80 Index | 100 | 100 | 100 | 100 |

*Not an example of the invention
[1] A 5000 molecular weight ethylene oxide/propylene oxide adduct of glycerine containing 25 weight percent dispersed styrene/acrylonitrile polymer
[2] A 5000 molecular weight ethylene oxide (20 percent cap)/propylene oxide adduct of glycerine
[3] Surfactant sold by Dow Corning
[4] Surfactant sold by Dow Corning
[5] A formic acid blocked bis(dimethylaminoethyl) ether, 30 percent active in dipropylene glycol sold by Air Products
[6] An acid blocked mixture comprising triethylene diamine, N,N'-diethylaminoethylmorpholine and bis(dimethylaminoethyl) ether sold by Union Carbide
[7] Diamine urea-modified cell opener, equivalent weight 1097, 4 urea moieties/molecule

TABLE II

|  | Comp Sample A* | Sample I | Sample II | Sample III |
|---|---|---|---|---|
| density kg/m³ | 29.3 | 29.1 | 29.6 | 30.5 |
| tensile strength (Kpa) | 1710 | 1676 | 1703 | 1448 |
| tear resistance (N/M) | 16.8 | 15.9 | 17.7 | 15.0 |
| resilience % | 41 | 41 | 39 | 36 |
| elongation % | 189 | 191 | 192 | 171 |
| ILD 25% | 30.6 | 29.8 | 29.3 | 22.8 |
| 65% | 85.3 | 84.2 | 85.2 | 69.3 |
| modulus | 2.79 | 2.82 | 2.91 | 3.04 |
| hysteresis % | 72 | 71 | 69 | 72 |
| compression sets (50%) | 29 | 33 | 37 | 32 |

*Not an example of the invention

Cup foams are prepared with formulations for Comparative Sample A, Samples II and III. The following reactivity and sigh-back times are observed.

|  | Comp Sample A* | Sample II | Sample III |
|---|---|---|---|
| cream time (sec) | 10 | 6 | 5.5 |
| rise time (sec) | 22.5 | 22.1 | 22.8 |
| gel time (sec) | 52 | 43 | 49 |
| sigh-back time (sec) | 85 | 83 | 59 |

*Not an example of the invention

The foaming mixture is watched to observe any "blow-off" (a release of gas which indicates the opening of cells). When the "blow-off" occurs, the height of the foam is slightly reduced, the time at which reduction in height occurs is defined as the sigh-back time. The shorter the sigh-back time, the sooner the occurrence of cell opening.

The data clearly indicates that high resilience polyurethane foams can be prepared in the presence of the modified polyamine as cell opening agent and which have acceptable physical properties. The earlier sigh-back observation indicates that the cell opening ability of the formulation is clearly enhanced by using small quantities of the polyamine cell opening agent.

EXAMPLE 2

Cup foams are prepared according to the formulation given below.

| Polyol B [1] | 50 |
|---|---|
| Polyol C [2] | 50 |
| Water | 4.0 |
| Diethanolamine | 1.5 |
| DC-5043 | 1.5 |
| DC-X2-5244 | 1.2 |
| Polycat X-543 | 0.7 |
| Dabco BL-17 | 0.4 |
| Dabco BL-11 | 0.15 |
| Voranate T-80 (Index 100) | 47.6 parts |
| Polyamine cell opener (various) | 4.0 |

[1] See Example 1
[2] Multranol ™ 9151 sold by Mobay Chemical Corporation, a polyurea dispersion in a 6000 molecular weight triol with a hydroxyl number of about 28

The reactivity and sigh-back times observed are as follows.

| Polyamine Cell Opener | (eq wt)/cmb [1] | cream time (sec) | rise time (sec) | gel time (sec) | sigh-back time (sec) |
|---|---|---|---|---|---|
| polyureadiamine | 1097/5 | 4.5 | 16.1 | 35 | 63 |
| polyureadiamine | 733/4 | 4.0 | 14.8 | 35 | 61 |
| polyureadiamine | 4933/4 | 5.5 | 17.1 | 38 | 48 [2] |
| polyamidediamine | 1095/8 | 4.0 | 15.9 | 37 | 63 |
| polybiuretdiamine | 1159/4 | 5.5 | 16.1 | 36 | 69 |
| control [3] (0 parts polyamine cell opener) |  | 6.0 | 16.4 | 38 | 72 |

[1] cmb is the average number of carbonyl moieties in backbone/molecule
[2] partial collapse of foam observed
[3] comparative example, not an example of the invention As can be seen from the difference in sigh-back times with respect to the control employing a constant quantity of modified polyamine, the cell opening ability of the polymer is enhanced.

It can also be observed that in the examples with the polyurea diamine, the cell opening ability improves with increasing equivalent weight of the polyamine for a given average number of carbonyl moieties in its backbone.

The polyurea diamine having an equivalent weight of 4933 shows very strong cell opening ability. Use of this agent at 4 parts by weight in the formulation can be sufficient to encounter partial collapse of the foam depending on the polyisocyanate-reactive components used in making the foam.

What is claimed is:

1. An open-celled polyisocyanate-based polymer the preparation of which comprises reacting in the presence of a blowing agent,
   (a) an organic polyisocyanate,
   (b) at least one polyfunctional isocyanate-reactive component, and
   (c) from about 0.1 to about 15 percent by weight, relative to the amount of (b), of a cell opener which comprises a polyamine containing at least two terminal amine moieties, at least three polyalkyleneoxy moieties and at least two aminocarbonyl or aminothiocarbonyl moieties selected from the group consisting of urea, amide, biuret, thiourea, thioamide and dithiobiuret, or mixtures thereof provided that each aminocarbonyl or aminothiocarbonyl moiety is separated from each terminal amine moiety by at least one polyalkyleneoxy moiety.

2. The polymer of claim 1 wherein the terminal amine moieties of the polyamine are primary amine groups and said polyamine has an equivalent weight from about 70 to about 10,000.

3. The polymer of claim 2 wherein the polyamine contains at least two urea moieties and has an equivalent weight of from about 200 to about 6000.

4. The polymer of claim 3 wherein the polyamine has an equivalent weight of from about 1000 to about 4000.

5. The polymer of claim 2 wherein the polyamine contains at least two amide moieties and has an equivalent weight of from about 200 to about 6000.

6. The polymer of claim 2 wherein the polyamine contains at least two biuret moieties and had an equivalent weight of from about 200 to about 6000.

7. The polymer of claim 5 wherein the polyamine has an equivalent weight of from about 1000 to about 4000.

8. The polymer of claim 6 wherein the polyamine has an equivalent weight of from about 1000 to about 4000.

9. The polymer of claim 2 wherein the cell opener is present in from about 1 to about 10 percent by weight of the polyfunctional isocyanate-reactive component present.

10. The polymer of claim 1 wherein the polyfunctional isocyanate-reactive component is a compound containing nominally from 1 to about 8 isocyanate-reactive hydrogens and having an equivalent weight from about 31 to about 5000.

11. The polymer of claim 10 wherein the isocyanate-reactive component contains nominally from about 2 to about 4 isocyanate-reactive hydrogens and having an equivalent weight from about 500 to about 3000.

12. The polymer of claim 11 wherein the isocyanate-reactive component is a polyoxyalkylene polyol.

13. The polymer of claim 1 wherein the organic polyisocyanate is an aromatic polyisocyanate.

14. The polymer of claim 13 wherein the aromatic polyisocyanate is toluene diisocyanate, methane diphenylisocyanate, polymethylene polyphenylisocyanate, or derivatives or mixtures thereof.

15. The polymer of claim 14 wherein the isocyanate is present in such a quantity so as to provide from about 0.8 to about 1.3 isocyanate groups for each isocyanate-reactive hydrogen present in the reaction mixture.

16. The polymer of claim 1 having a density from about 6 to about 150 kg/m³.

17. The polymer of claim 2 wherein the polyamine is represented by the formula $H_2N-R-(Y-R)_n-NH_2$ wherein R is a polyoxyalkylene moiety having a molecular weight from about 44 to about 7200: Y is an aminocarbonyl or aminothiocarbonyl selected from the group consisting of urea, amide, biuret, thiourea, thioamide or dithiobiuret, or mixtures thereof: and n is a positive integer greater than or equal to 2 such that the equivalent weight of the polyamine is from about 70 to about 10,000.

18. An isocyanate-reactive composition which comprises (a) at least one polyfunctional isocyanate-reactive component, and (b) from about 0.1 to about 15 percent by weight, relative to (a), of a cell opener characterized in that the cell opener comprises polyamine containing at least two terminal amine moieties, at least three polyalkyleneoxy moieties and at least two aminocarbonyl or aminothiocarbonyl moieties selected from the group consisting of urea, amide, biuret, thiourea, thioamide and dithiobiuret, or mixtures thereof provided that each aminocarbonyl or aminothiocarbonyl moiety is separated from each terminal amine moiety by at least one polyalkyleneoxy moiety.

19. The composition of claim 18 wherein the polyamine is represented by the formula $H_2N-R-(Y-R)_n-NH_2$ wherein R is a polyoxyalkylene moiety having a molecular weight from about 44 to about 7200: Y is an aminocarbonyl or aminothiocarbonyl selected from the group consisting of urea, amide, biuret, thiourea, thioamide or dithiobiuret, or mixtures thereof; and n is a positive integer greater than or equal to 2 such that the equivalent weight of the polyamine is from about 70 to about 10,000.

20. The composition of claim 19 wherein the polyfunctional isocyanate-reactive component contains from nominally 1 to about 8 isocyanate-reactive hydrogens and has an equivalent weight from about 31 to about 5000.

21. The composition of claim 20 wherein the polyfunctional isocyanate-reactive component contains nominally from about 2 to about 4 isocyanate-reactive hydrogens and has an equivalent weight from about 500 to about 3000.

22. The composition of claim 21 which includes, optionally, a blowing agent and/or catalyst.

* * * * *